United States Patent [19]
Brady

[11] Patent Number: 5,758,336
[45] Date of Patent: May 26, 1998

[54] DATE FORMAT AND DATE CONVERSION PROCEDURE USING A PACKED BINARY FORMAT

[75] Inventor: James T. Brady, San Jose, Calif.

[73] Assignee: MatriDigm Corp., Fremont, Calif.

[21] Appl. No.: 657,657

[22] Filed: May 30, 1996

[51] Int. Cl.$^6$ .................................................. G06F 17/30
[52] U.S. Cl. ...................... 707/6; 707/100; 707/201
[58] Field of Search .................... 707/6, 100, 201

[56] References Cited

U.S. PATENT DOCUMENTS

| | | | |
|---|---|---|---|
| 4,001,570 | 1/1977 | Gooding et al. | 364/771 |
| 5,600,836 | 2/1997 | Alter | 707/101 |
| 5,630,118 | 5/1997 | Shaughnessy | 707/1 |
| 5,644,762 | 7/1997 | Soeder | 707/6 |
| 5,668,989 | 9/1997 | Mao | 707/101 |

OTHER PUBLICATIONS

Digit Dates: A Guide for Planning and Implementation, IBM Corp., Jan. 1,1995, 4–1, to 4–12.

*Primary Examiner*—Wayne Amsbury
*Attorney, Agent, or Firm*—Ohlandt, Greeley, Ruggiero & Perle

[57] ABSTRACT

A binary date format, hereafter referred to as "packed binary", is used and comprises a 2-byte data field. The first two bits of the data field are utilized as identifiers to enable the packed binary format to be identified. The remaining bits are employed as a binary value year indication. A date conversion procedure employs the packed binary format and is called when a program reaches a date field that is to be processed. The date conversion procedure initially examines the date field to determine whether its format is zone decimal, packed decimal or packed binary. If the date field data format is either zone decimal or packed decimal, the date values are converted to packed decimal and the required arithmetic procedure is performed, using the packed binary format date value. Once the calculation is complete, the procedure determines whether a "year 2000" switch is set—indicating that all results are to be returned to the program in packed binary format. If the 2000 switch is not set, the date conversion procedure reconverts the packed binary year format back to the originally received format and returns the result to the running program.

13 Claims, 2 Drawing Sheets

ZONE DECIMAL

PACKED DECIMAL

PACKED BINARY

DATE FORMAT AND DATE CONVERSION PROCEDURE USING A PACKED BINARY FORMAT

FIELD OF THE INVENTION

This invention relates to a method for avoiding calculation ambiguities which result from the use of year dates from the year 2000 and forward and, more particularly, to an improved date format and method for the use thereof which avoids such calculation ambiguities and, at the same time, requires no modification of the size of date fields already present in current software.

BACKGROUND OF THE INVENTION

Software applications use dates in a myriad of operations, from complex financial transactions to the expiration dates of driver's license and credit cards. Many such applications base their calculations on dates, subtracting two-digit year values from one another to arrive at a calculation result. For example, calculations of interest on a 5-year certificate of deposit involves the subtraction of the CD's issue date from the current date and a determination of interest based upon the difference. This is no problem if the CD matures in 1999, but if it matures in 2001, the same computations can result in an error message or worse.

In the year 2000, the two year digit indications start over at "00", and unless something is done to distinguish such dates, they will appear to precede the year 1900 -- or so it will seem to many programs that use only the year's last two digits for dates. The same problem is present in programs which process invoices, payrolls, credit card transactions, bill payments, inventory systems, data bases that sort by year and many other computer operations.

In the early days of data processing, storage space was at a premium and it was decided to use two digits for the year indication. As a result, most programs today employ two bytes of eight bit binary data to indicate the last two decimal values of the year. While it appears straightforward to convert a two byte decimal year indication to a four decimal year indication, the problem is that a monumental number of programs must searched and corrected. Further, each correction, if performed in the manner taught by the prior art, must involve an expansion of date fields; a revision of job control languages to cope with the date field change and the alteration of each application in such a manner as to accommodate the changed date field.

Currently, there are two widely used methods for decimal representation of the year. Both employ hexadecimal notation. One representation is called "zone decimal" and is widely utilized in COBOL programs. Zone decimal employs two 8-bit bytes, with the low order four bits of each byte representing a decimal digit. Such a representation is shown in FIG. 1, with high order byte 10 comprising four bits which are used for the high order date digit and four 1-bits (or a hexadecimal F) that are used as a filler. Low order byte 12 similarly comprises a hexadecimal F along with the four bits which indicate the low order date digit. The filler 1-bits (F) are employed to enable proper placement of the digit bits for printing. More specifically, most processors are only able to handle data on byte boundaries and the use of the four filler bits provides placement information for subsequent print operations.

A substantial portion of the computer population also employs a date format shown in FIG. 2, which is known as "packed decimal". In packed decimal, a high order byte 14 includes 4 unused bit positions (all 0's) and four bits which indicate the high order date digit. A low order byte 16 includes four bits which designate the low order date digit and a sign value which, in date applications, is always positive or a hexadecimal "C".

From an examination of FIGS. 1 and 2, it can be seen that conversion of the zone decimal format to handle a full four digit date would require that programs be converted to recognize the filler or "F" fields. In a similar manner, program alterations would be required to recognize the reallocation of the fields in the packed decimal notation. In either case, the conversion process (i) is extraordinarily large, (ii) must be accomplished and in place as soon as possible to take care of the "year 2000" problem and (iii) requires that all cooperating programs be converted before they can be operated in conjunction with each other.

Accordingly, it is an object of this invention to provide a date format which is compatible with widely used current date formats and whose use avoids ambiguous calculation results.

It is another object of this invention to provide a procedure for employing a date format which enables programs to operate in conjunction with each other, irrespective of whether they have or have not been converted.

SUMMARY OF THE INVENTION

The invention employs a binary format, hereafter referred to as "packed binary", comprising a two byte data field. The first two bits of the data field are utilized as identifiers to enable the packed binary format to be recognized. The remaining 14 bits are employed as a binary value year indication. A date conversion procedure employs the packed binary format and is called when a program reaches a date field that is to be processed. In response to the call, the date conversion procedure initially examines the date field to determine whether its format is zone decimal, packed decimal or packed binary. If the date field data format is either zone decimal or packed decimal, the date value is converted to packed binary and the required arithmetic procedure is performed, using the packed binary format date value. Once the calculation is complete, the procedure determines whether a "year 2000" switch is set—indicating that all results are to be returned to the program in packed binary format. If the 2000 switch is not set, the date conversion procedure reconverts the packed binary year format back to the originally received format and returns the result to the running program.

DETAILED DESCRIPTION OF THE INVENTION

Figure 3:
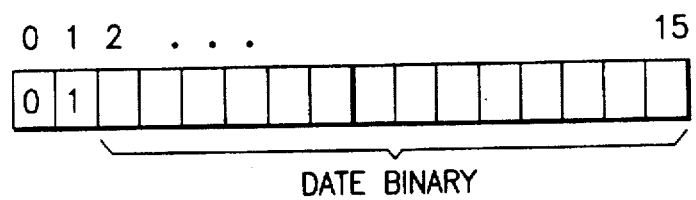
FIG. 3 is a schematic showing the packed binary date format employed by the invention hereof.

Referring to FIG. 3, the invention employs a packed binary format comprising two bytes, two bits of which are employed to identify the packed binary format. Preferably, bit positions 0 and 1 are assigned either 0, 1, or 1, 0 bit values, depending upon the chosen identifier. Either identifier is acceptable, so long as only one is consistently used.

Figure 1:
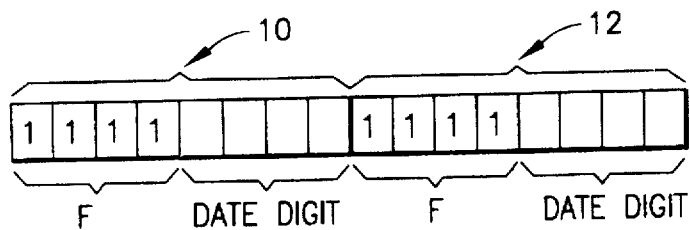
FIG. 1 is a schematic of a zone decimal year designation.
Figure 2:
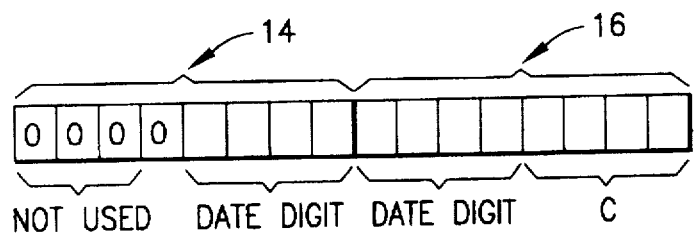
FIG. 2 is a schematic representation of a packed decimal year designation.

From a review of the zone decimal and packed decimal formats shown in FIGS. 1 and 2, it can be seen that the packed binary format can be distinguished from the zone decimal format because the zone decimal format always has two "1" bits in its high order bit positions (i.e., the result of the "F" filler that is present therein). The packed binary identifier can always be distinguished from a packed decimal format because the two high order bits of packed decimal are always "0's". Thus, by examining the two high order bits of a date field, it can readily be determined whether the format is zone decimal, packed decimal or packed binary.

As indicated above, an object of this invention is to assure that the date conversion program cope with the "year 2000" problem by enabling interdependent programs to run together, whether they have or have not been converted. The prior art requires that only converted programs or nonconverted programs run in conjunction with each other, respectively. As will hereafter be understood, the procedure of the invention employs the packed binary notation and enables both converted and non-converted programs to run in conjunction with each other. Further, such programs may or may not be restored, after processing, to their original state, as the case may be.

Figure 4:
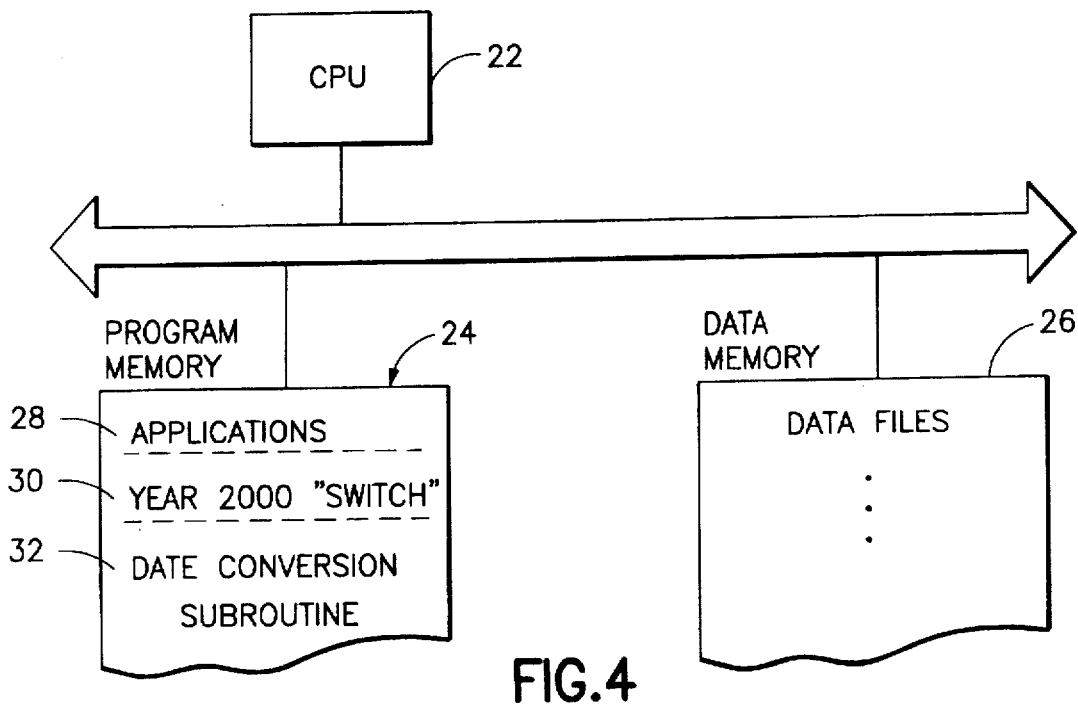
FIG. 4 is a high level block diagram of a computer system which employs the date conversion procedure of the invention.

FIG. 4 illustrates a computer system adapted to carry out the method of the invention. A central processing unit (CPU) 22 is coupled to a program memory 24 which includes various applications 28, a year 2000 "switch" 30 (whose function will be described below), and a date conversion sub-routine 32. A data memory 26 includes plural files of data that are accessed and altered by applications 28 within program memory 24.

The procedure implemented by the invention hereof enables date conversions to be performed "on the fly" and does not require that all applications and data files be date-translated in advance. Further, date conversion subroutine 32 enables a date conversion to occur during processing and then to return the processed data back to its pre-conversion form (if desired). Finally, date conversion subroutine 32, through its use of the packed decimal format, is fully compatible with present date field formats and requires no changes in field length.

As indicated above, the zone decimal format always includes two 1-bits in its high order bit positions. Packed decimal, by contrast, always exhibits two 0-bits in its high order positions. Packed binary, by contrast, always has a 0 and a 1 in its high order bits. Thus, examining the two high order bits of date field enables the date format to be determined. Use of the remaining 14 bits in the packed binary format enables 16,384 years of dates to be designated and completely avoids the problem of the two decimal year designation, while retaining the two byte date field structure of the prior art.

In advance of use of date conversion subroutine 32, each application program must be examined to locate regions of code where data fields exist that include year values. The initial code examination process commences by scanning the program's source code data definitions section for data field names (i.e., labels in the COBOL context) that are indicative of date. It is preferred that this procedure be accomplished using a pattern matching string search for labels that contain character strings such as: "DATE", "YEAR", "YR", "YY", "MONTH", "MON", "MO", "MM", "DAY", "DA", "DD", "DOB" (date of birth), and so on. This search identifies candidate fields where the year designation will probably be found. They are "candidates" because there is no guarantee that having such a string in a label makes it a date field or requires that it have a date designation therein. Nevertheless, the initial search enables a first cut identification of fields wherein a date may be found.

Next, the source code data definitions are again scanned for data formats that are consistent with dates. In COBOL, the following code arrangement provide a hint that it includes a date:

```
01 X3A400.
   02 X3A410 PIC 99
   02 X3A420 PIC 99
   02 X3A420 PIC 99
```

The first line of the above code listing identifies the following three fields as a 6-digit date field, with each of the succeeding lines indicating, respectively, a 2-digit month field; a 2-digit day field; and a 2-digit year field. The enclosure of the three 2-digit fields inside the X3A400 field is a strong indicator that these fields are date fields. This example is meant to be only one of a number of possible code arrangements which may include a date field. Those skilled in the art will realize that there are other code arrangements which will provide indicators that they are date fields. Each of those date field definitions should be identified.

Once the date field data definitions are identified, a program to be subjected to date conversion subroutine 32 is examined to identify where in the program each date field is located. In a COBOL program, this is found in the "Procedure Division" portion of the program. Essentially, this action enables the regions within the program that employ date fields to be identified and does not affect the data that is acted upon by the program.

Thereafter, the programmer examines each identified field and identifies what the specific code statement requires with respect to the identified date field. For instance, a statement of "add 1 to year" or another equivalent date modification statement may be present. At an appropriate point at each date usage, a call is inserted to date conversion subroutine 32. The modified program is then compiled, linked and is then ready for execution.

Figure 5:
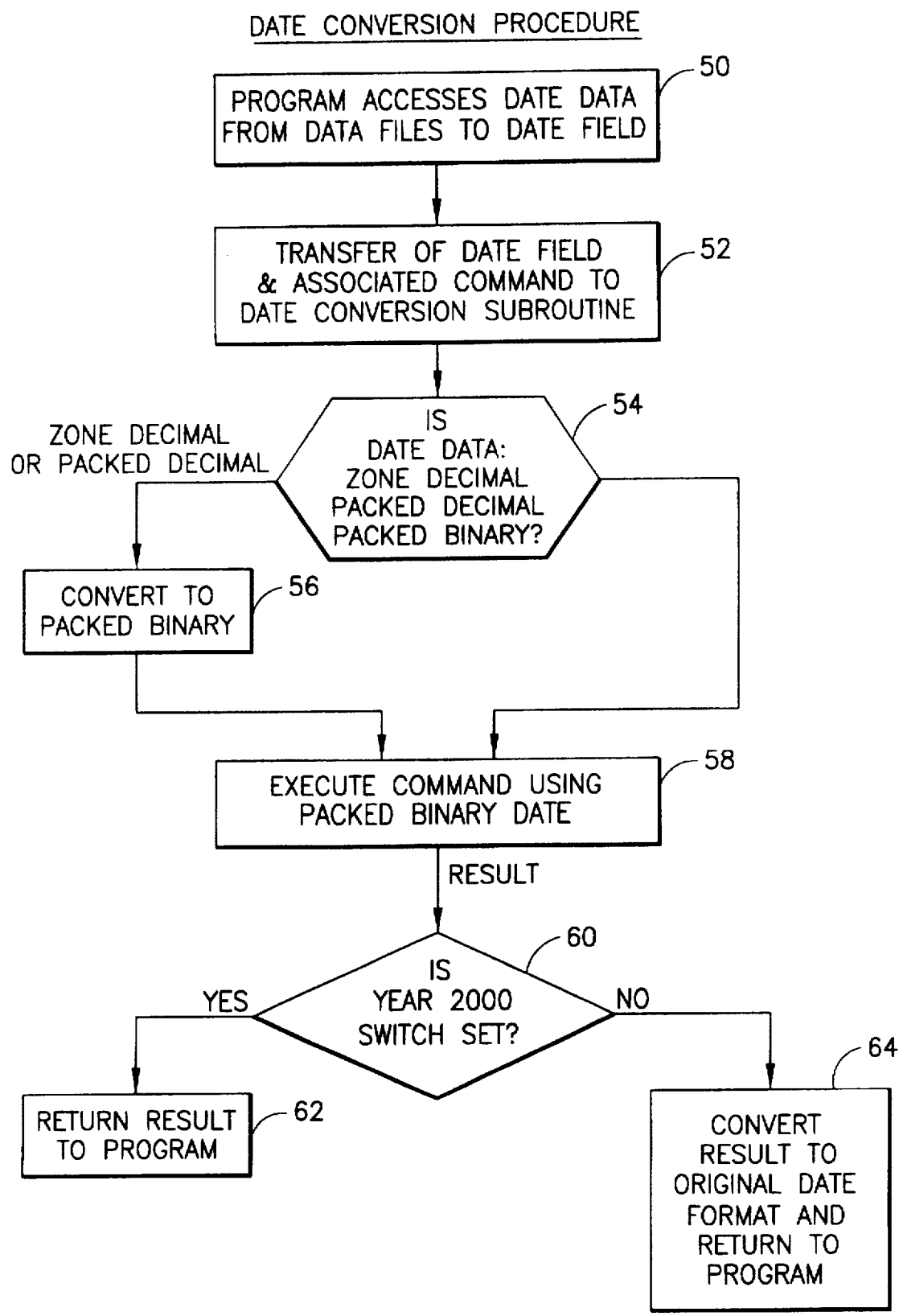
FIG. 5 is a flow diagram which illustrates the packed binary date conversion procedure.

The procedure of the invention will now be described in accordance with the flow diagram of FIG. 5. At the point of occurrence of a date field in an executing program, and preferably after the program has accessed date data from data memory 26 (i.e., box 50), the data field and associated program statement are passed to data conversion subroutine 32 (box 52). Therein, the date data is examined to determine if it is in zone decimal format, packed decimal format, or packed binary format (decision box 54). This discrimination is accomplished through an examination of the two high order bit positions of the date field.

If the date format is found to be zone decimal or packed decimal, the date data is converted to packed binary format (box 56). If the date data is found to be packed binary, it remains unchanged. The packed binary format date data is then altered in accordance with the operational statement from the executing program (box 58). It is to be understood that the conversion of the year value from zone decimal or packed decimal, to packed binary (and vice-versa) may be performed by any appropriate prior art date conversion procedure (e.g., see the "NORCOMM Date Routines"

manual published by NORCOMM, 2217 North Jordan Ave., Juneau, Alaska 99801).

Once the commanded operation on the date is performed, the procedure determines if "year 2000" switch 30 is set. Year 2000 switch 30 determines whether the output format of the date data is to be in packed binary or in the original format of the date field. At some point, the user will decide that all date data is to be maintained in the packed binary format. Under such a condition, the year 2000 switch is set and no output conversion of date data is thereafter required. Assuming that the year 2000 switch is set (decision box 60), the packed binary format result is fed to the executing program (box 62) and the program continues executing.

If the year 2000 switch is not set, conversion subroutine 32 converts the packed binary date format back to the original date format and returns the converted result to the application (box 64).

Date conversion subroutine 32 provides a number of benefits. Data files do not have to converted because the conversion happens dynamically during processing. Thus, date conversion subroutine 32 operates on any identifiable date format encompassing two bytes. Date conversion subroutine 32 further produces packed binary date format outputs, only after year 2000 switch 30 is set. Date data field sizes remain unchanged, accomplishing a savings in memory and disk space. Job control languages do not have to be modified because the record size does not change, an important savings of programmer time. Finally, one program can be converted at a time, because each program can operate on date data in any format at any time (i.e., a converted program can communicate with an unconverted program). Other date conversion techniques that change a date to a 4-digit form require that all programs that communicate through files (the great majority of all programs) be converted before they can be run together. This complexity is avoided entirely by the invention.

The above invention has been described in the context of certain versions of zone decimal and packed decimal notations. Other versions of date notation are also compatible with the invention. For instance, many work stations and PC's use ASCII code wherein the hexadecimal code for the relevant year notations are 30 through 39. In these notations, the COBOL zone decimal numbers would have high order bits of "00" binary which could be distinguished as indicated above. The procedure of the invention would be altered in such case to recognize that "00" bits represent the aforesaid format rather than packed decimal.

Further, the invention is compatible when year date fields are used that are not two bytes long, e.g., four bytes. To convert a four byte year notation, the year value is converted to the two byte packed binary notation described above, and the extra two bytes are padded with a pad character. Other year notations can be handled similarly.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A memory media including control software for operation in conjunction with a program operating on a computer, said program processing date field data, said memory media comprising:

first means for logically determining from said date field data from said program, a date format of said date field data, and for examining at least one bit position of said date field data to perform said determining operation;

second means responsive to a determination by said first means of the format of said date field, to convert said date field data to a packed binary format wherein at least one bit indicates said packed binary format and at least some remaining bits of said packed binary format represent a binary value indicative of a four digit year value; and third means for performing a logical operation using said packed binary format year value.

2. The memory media as recited in claim 1, further comprising:

fourth means responsive to a control manifestation, for returning to said program date field data in either (i) a same date format as received from said program, or (ii) a packed binary date format.

3. The memory media as recited in claim 2 wherein said packed binary format is two bytes in length.

4. The memory media as recited in claim 3, wherein said date field data from said program is greater than two bytes in length, and said fourth means, when returning said packed binary format to said program, appends thereto padding bits to render returned date field data of equal size as said date field data from said program.

5. The memory media as recited in claim 1, wherein said date field data from said program is two bytes in length and is either a zone decimal format or a packed decimal format.

6. The memory media as recited in claim 5, wherein said first means determines said date format by examining two high order bits of said date field data and (i) if said bits two high order bits are both "1's", determines that said date format is zone decimal, or (ii) if said bits are both "0's", determines that said date format is packed decimal.

7. The memory media as recited in claim 1, wherein said packed binary date format comprises two bytes of digital data, with two high order bits of one byte used to identify said packed binary date format and remaining bits of said bytes used to provide a four digit year value.

8. A method for handling date data in a computer, said method comprising the steps of:

issuing a call to a date conversion subroutine when a date field is to be processed in a program running on said computer;

transferring date data from said date field to said date conversion subroutine;

determining from said date data, a date format thereof by examining at least one bit position of said date data;

if said date format is determined to be other than a packed binary format, converting said date data to said packed binary format, wherein at least one bit of said packed binary format indicates said packed binary format, and at least some remaining bits of said packed binary format represent a binary value indicative of a four digit year value; and performing a logical operation using said packed binary format year value.

9. The method as recited in claim 8, further comprising the step of:

responding to a control manifestation from said computer, by returning date data to said program in (i) a same date format as received from said program, or (ii) a packed binary date format.

10. The method as recited in claim 9, wherein said date data from said program is greater than two bytes in length and said packed binary format is two bytes in length, said responding step, when returning said packed binary format to said program, appending thereto padding bits to render returned data which includes said packed binary format, of equal size as said date data from said program.

11. The method as recited in claim 9, wherein said transferring step transfers date data in a two byte format comprising either a zone decimal format or a packed decimal format.

12. The method as recited in claim 11, wherein said determining step determines said date format by examining two high order bits of said date data and (i) if said bits are both "1's", determines that said date format is zone decimal, or (ii) if said bits are both "0's", determines that said date format is packed decimal.

13. The method as recited in claim 9, wherein said packed binary date format comprises two bytes of digital data, with two high order bits of one byte used to identify said packed binary date format and remaining bits of said bytes used to provide a four digit year value.

* * * * *